United States Patent
Sugimoto et al.

(10) Patent No.: US 12,170,795 B2
(45) Date of Patent: Dec. 17, 2024

(54) IMAGE ENCODING METHOD, IMAGE DECODING METHOD, IMAGE ENCODING APPARATUS, IMAGE DECODING APPARATUS AND PROGRAM

(71) Applicant: NIPPON TELEGRAPH AND TELEPHONE CORPORATION, Tokyo (JP)

(72) Inventors: Shiori Sugimoto, Musashino (JP); Seishi Takamura, Musashino (JP); Takayuki Kurozumi, Musashino (JP); Hideaki Kimata, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 92 days.

(21) Appl. No.: 17/783,208

(22) PCT Filed: Dec. 9, 2019

(86) PCT No.: PCT/JP2019/048034
§ 371 (c)(1),
(2) Date: Jun. 7, 2022

(87) PCT Pub. No.: WO2021/117082
PCT Pub. Date: Jun. 17, 2021

(65) Prior Publication Data
US 2023/0012229 A1    Jan. 12, 2023

(51) Int. Cl.
*H04N 19/82* (2014.01)
*H04N 19/61* (2014.01)
*H04N 19/91* (2014.01)

(52) U.S. Cl.
CPC ............. *H04N 19/91* (2014.11); *H04N 19/61* (2014.11)

(58) Field of Classification Search
CPC ......... H04N 19/91; H04N 19/61; H04N 19/82
See application file for complete search history.

(56) References Cited

U.S. PATENT DOCUMENTS

| 5,862,264 A | 1/1999 | Ishikawa et al. |
| 6,775,415 B1 * | 8/2004 | Clausen ................ H04N 19/99 375/E7.204 |

(Continued)

FOREIGN PATENT DOCUMENTS

JP    H09252468 A    9/1997

OTHER PUBLICATIONS

Guo et al. (J. Guo and J. Sun, "An Image Compression Method of Fractal Based on GSOFM Network," 2008 Congress on Image and Signal Processing, Sanya, China, 2008, pp. 421-425, doi: 10.1109/CISP.2008.683.) (Year: 2008).*

(Continued)

*Primary Examiner* — Patrick E Demosky
(74) *Attorney, Agent, or Firm* — Harness, Dickey & Pierce, P.L.C.

(57) ABSTRACT

An image coding method includes: an image acquisition step of acquiring a coding-target image; a feature map generation step of generating a feature map, based on the image; a contraction function generation step of performing fractal compression of the feature map and generating a contraction function; and an entropy encoding step of performing entropy encoding of the contraction function.

7 Claims, 3 Drawing Sheets

(56) References Cited

U.S. PATENT DOCUMENTS 11,868,895 B2 * 1/2024 Huang ................... G06N 3/063
2007/0172139 A1 * 7/2007 Rising ................... H04N 19/99
                                                                  382/249

OTHER PUBLICATIONS

Jacquin et al. (A. E. Jacquin, "Image coding based on a fractal theory of iterated contractive image transformations," in IEEE Transactions on Image Processing, vol. 1, No. 1, pp. 18-30, Jan. 1992, doi: 10.1109/83.128028.) (Year: 1992).*
Arnaud E. Jacquin, Image coding based on a fractal theory of iterated contractive image transformations, IEEE Transactions on Image Processing, vol. 1, No. 1, 1992, pp. 18-30.

* cited by examiner

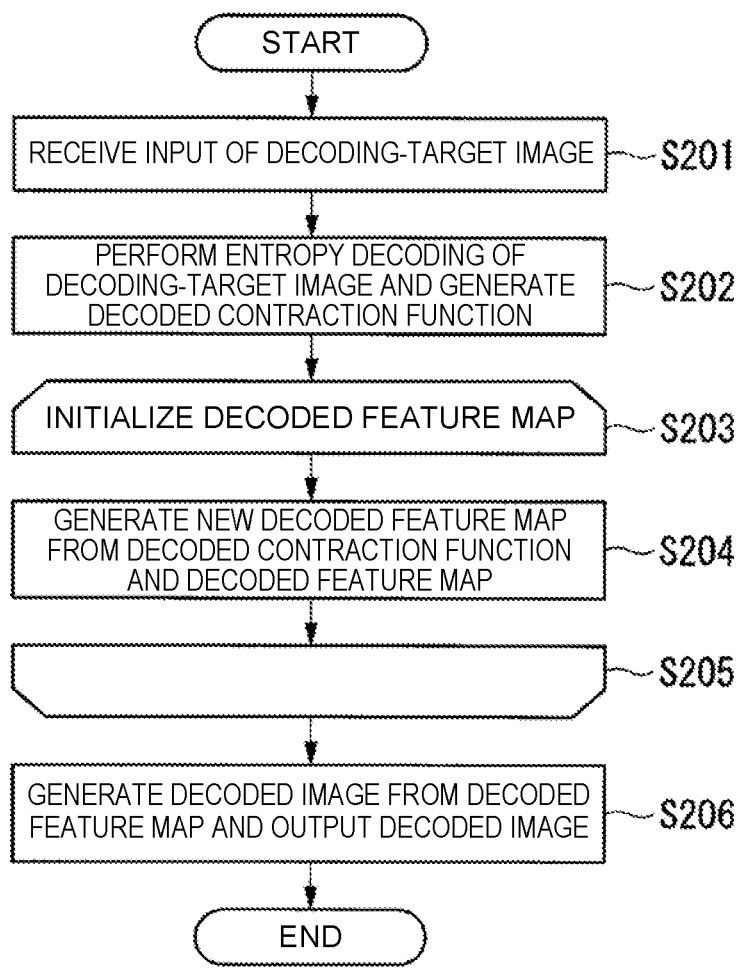

IMAGE ENCODING METHOD, IMAGE DECODING METHOD, IMAGE ENCODING APPARATUS, IMAGE DECODING APPARATUS AND PROGRAM

CROSS-REFERENCE TO RELATED APPLICATIONS

This application is a 371 U.S. National Phase of International Application No. PCT/JP2019/048034, filed on Dec. 9, 2019. The entire disclosure of the above application is incorporated herein by reference.

TECHNICAL FIELD

The present invention relates to an image coding method, an image decoding method, an image coding device, an image decoding device, and a program.

BACKGROUND ART

In general image compression coding, entropy encoding is performed after orthogonal transformation from an image domain into a frequency domain is performed by using DCT (discrete cosine transform), DST (discrete sine transform), or wavelet transform. The number of data is unchanged before and after the transformation and so the amount of information is not reduced because dimensionality of a transform basis is the same as dimensionality of an image, but improvement in coding efficiency contributed to the entropy encoding is provided because data distribution becomes one-sided as a result of the transformation. At the time, the amount of information can be further reduced by crude quantization of high-frequency components, which are said to have low rates of contribution to subjective image quality.

Moreover, particularly in video coding that needs to efficiently compress a plurality of images, to increase a compression ratio, each image is partitioned into processing-unit blocks, an image signal of an object is spatially/temporally predicted for each block by utilizing spatial/temporal continuity of the object, and prediction information, which indicates a method for such prediction, and a prediction residual signal, after subjected to the above-mentioned transformation and quantization, are coded, whereby coding efficiency is greatly improved, compared to a case in which an image signal is directly coded.

In JPEG (Joint Photographic Experts Group), H.264/AVC (Advanced Video Coding), and H.265/HEVC (High Efficiency Video Coding), which are image/video coding standards, the amount of a generated code is controlled by adjusting QP (quantization parameter) used when a coefficient of DCT or DST is quantized. On the other hand, loss of high-frequency components due to increased QP, and block distortion occurring at block boundaries affect image quality.

On the other hand, in a method called fractal compression, based on a fact that each partial area of an image can be approximated through contraction of another partial area, a function for the contraction is coded, instead of coding the image or a coefficient of transformation of the image (for example, see Non-Patent Literature 1). In decoding, the original image is decoded by iterated application of the contraction function to an arbitrary image. The method is based on a collage theorem, which states that if a collage generated from a contracted image of an original image represents a good approximation of the original image, a collage similarly generated from an arbitrary image also comes to well approximate to the original image through iterations.

The method has characteristics that an image can be rendered by a small amount of code, compared to image coding based on prediction and transformation, and that a decoded image can be generated with an arbitrary resolution without deterioration. However, the method has a problem that coding requires a considerable amount of calculation, while the amount of calculation required for decoding is linear time. This is attributable to an enormous number of combinations of parameters of the contraction function when an area corresponding to a certain area is searched for. Accordingly, in practical uses, some measures are taken, such as restricting areas to search for and a rotation angle, or fixing a contraction ratio. However, it is rare for a coding-target image to be able to be appropriately approximated under such restrictions, and, in general, it is difficult to achieve high image quality with fractal compression coding.

CITATION LIST

Non-Patent Literature

Non-Patent Literature 1: A. E. Jacquin, "Image coding based on a fractal theory of iterated contractive image transformations," IEEE Transactions on Image Processing, vol. 1, no. 1, pp. 18-30, January 1992.

SUMMARY OF THE INVENTION

Technical Problem

As described above, although it is necessary to impose restrictions on a contraction function in order to realize fractal compression coding in a realistic time period, there is a problem that it is difficult to render a general image with high precision under such restrictions.

An object of the present invention, which has been made in view of such circumstances, is to provide a technology that makes it possible to perform fractal compression coding with high efficiency while restraining the amount of computation.

Means for Solving the Problem

An aspect of the present invention is an image coding method including: an image acquisition step of acquiring a coding-target image; a feature map generation step of generating a feature map, based on the image; a contraction function generation step of performing fractal compression of the feature map and generating a contraction function; and an entropy encoding step of performing entropy encoding of the contraction function.

An aspect of the present invention is an image decoding method including: a code acquisition step of acquiring a code obtained by entropy encoding of a contraction function generated through fractal compression; an entropy decoding step of decoding the code and generating the contraction function; a feature map decoding step of generating a feature map, based on the contraction function; and an image reconstruction step of generating an image, based on the feature map.

An aspect of the present invention is an image coding device including: an image acquisition unit that acquires a coding-target image; a feature map generation unit that generates a feature map, based on the image acquired by the image acquisition unit; a contraction function generation unit that performs fractal compression of the feature map generated by the feature map generation unit and generates a contraction function; and an entropy encoding unit that performs entropy encoding of the contraction function generated by the contraction function generation unit.

An aspect of the present invention is an image decoding device including: a code acquisition unit that acquires a code obtained by entropy encoding of a contraction function generated through fractal compression; an entropy decoding unit that decodes the code acquired by the code acquisition unit and generates the contraction function; a feature map decoding unit that generates a feature map, based on the contraction function generated by the entropy decoding unit; and an image reconstruction unit that generates an image, based on the feature map generated by the feature map decoding unit.

An aspect of the present invention is a program for causing a computer to execute the image coding method described above.

An aspect of the present invention is a program for causing a computer to execute the image decoding method described above.

Effects of the Invention

According to the present invention, it is possible to perform fractal compression coding with high efficiency while restraining the amount of computation.

BRIEF DESCRIPTION OF DRAWINGS

FIG. 4 is a flowchart showing operation of the image decoding device 200 according to an embodiment of the present invention.

DESCRIPTION OF EMBODIMENTS

Hereinafter, an image coding device 100 and an image decoding device 200 according to an embodiment of the present invention will be described with reference to drawings.

[Configuration of Image Coding Device]

First, a functional configuration of the image coding device 100 will be described with reference to FIG. 1.

Figure 1:
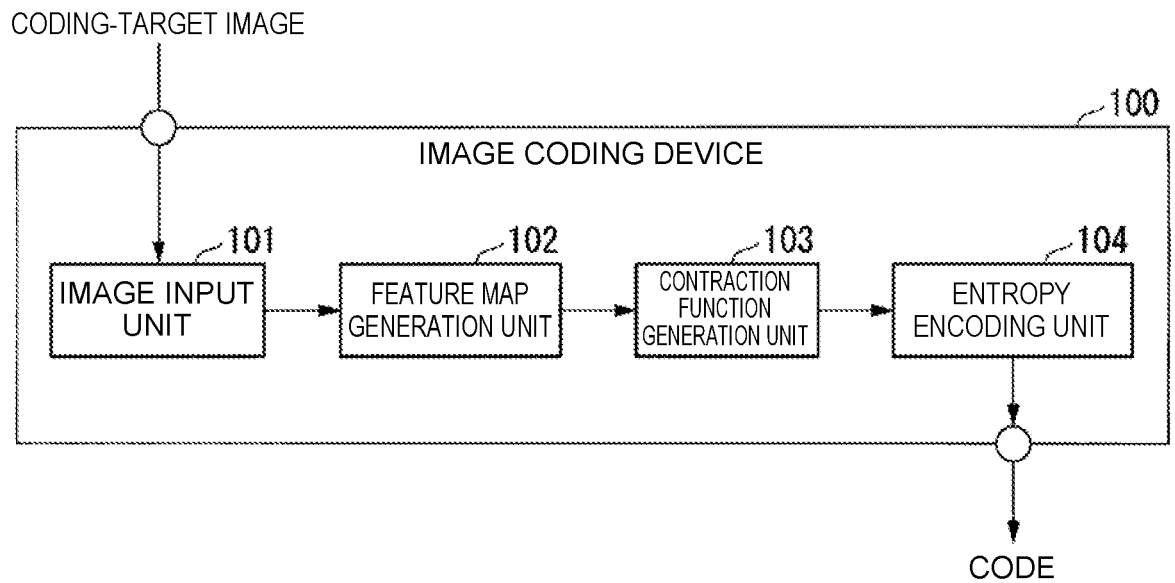
FIG. 1 is a block diagram showing a functional configuration of an image coding device 100 according to an embodiment of the present invention.

FIG. 1 is a block diagram showing the functional configuration of the image coding device 100 according to an embodiment of the present invention. As shown in FIG. 1, the image coding device 100 includes an image input unit 101, a feature map generation unit 102, a contraction function generation unit 103, and an entropy encoding unit 104.

The image input unit 101 (image acquisition unit) receives input of an image to be processed that is, for example, outputted from an external device or the like. Hereinafter, the image to be processed will be referred to as "coding-target image". The image input unit 101 outputs the coding-target image to the feature map generation unit 102.

The feature map generation unit 102 acquires the coding-target image outputted from the image input unit 101. The feature map generation unit 102 generates a feature map from the coding-target image. At the time, the feature map generation unit 102 generates the feature map such that the feature map has fractality. Note that the feature map generation unit 102 generates the feature map, for example, by using a learned model obtained through machine learning. Processing of generating the feature map by the feature map generation unit 102 will be described in detail later. The feature map generation unit 102 outputs the generated feature map to the contraction function generation unit 103.

The contraction function generation unit 103 acquires the feature map outputted from the feature map generation unit 102. The contraction function generation unit 103 performs fractal compression of the feature map and generates a contraction function. The contraction function generation unit 103 generates the contraction function, for example, by estimating correspondence by using a general method such as block matching, phase only correlation, or arbitrary feature matching. Alternatively, the contraction function generation unit 103 generates the contraction function, for example, by training a neural network or the like that directly estimates a parameter of the contraction function. The contraction function generation unit 103 outputs the generated contraction function to the entropy encoding unit 104.

The entropy encoding unit 104 acquires the contraction function outputted from the contraction function generation unit 103. The entropy encoding unit 104 performs entropy encoding of the contraction function and outputs a code to, for example, the image decoding device 200, which will be described later, or the like. Note that the entropy encoding unit 104 may be configured to encode arbitrary additional information, such as an initialization parameter to be used when the image is decoded and an optimization parameter, together with the contraction function.

[Operation of Image Coding Device]

Next, operation of the image coding device 100 shown in FIG. 1 will be described with reference to FIG. 2.

Figure 2:
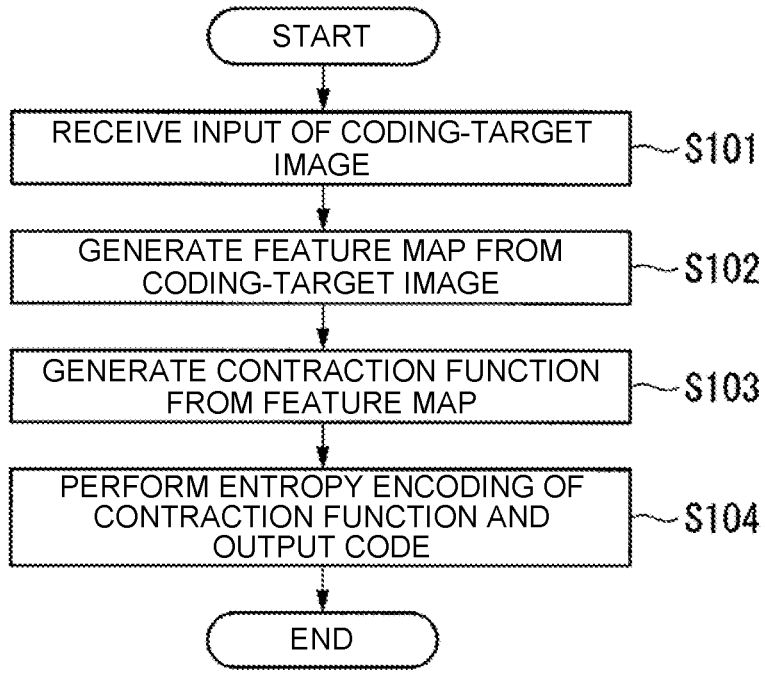
FIG. 2 is a flowchart showing operation of the image coding device 100 according to an embodiment of the present invention.

FIG. 2 is a flowchart showing the operation of the image coding device 100 according to an embodiment of the present invention.

First, the image input unit 101 receives input of a coding-target image (step S101). Next, the feature map generation unit 102 generates a feature map from the coding-target image (step S102).

At the time, the feature map is generated such that the feature map has fractality. The number of components of the coding-target image and the number of components of the feature map do not necessarily need to coincide. The feature map may be a set of a plurality of tensors with different numbers of components.

Hereinafter, as an example, it is assumed that the coding-target image I is a rank-2 tensor, w×h, and that the feature map M is a rank-3 tensor, w'×h'×d.

The feature map generation unit 102 may generate the feature map through any process. Hereinafter, as an example, a description will be given of a case in which the feature map is generated by using a learned model that is generated through machine learning, with the feature map generation unit 102 and an image reconstruction unit 205 that, counter to the feature map generation unit 102, generates the image from the feature map, configured as a neural network.

The feature map generation unit 102 is assumed to be "Gen", and the image reconstruction unit 205 is assumed to be "Rec". Moreover, an evaluation function based on the fractality of the feature map is assumed to be "$L_f$". At the time, "Gen", "Rec" perform learning such that a following expression (1) is satisfied. "λ" is an arbitrary weight.

[Math. 1]

$$Gen, Rec = \operatorname*{argmin}_{Gen,Rec} |Rec(Gen(I)) - I|_2^2 + \lambda L_f(Gen(I)) \quad (1)$$

"$L_f$" may be any evaluation function if the evaluation function is designed such that as an input has a lower fractality, a greater loss result. For example, a fractal dimension may be calculated for an input signal, and an evaluation function based on the fractal dimension may be defined. Alternatively, a contraction function may be obtained for an input signal, fractal decoding may be performed based on the contraction function, and an evaluation function based on error between a decoded signal and the input signal may be defined.

Alternatively, by using a fact that a power spectrum of a fractal signal with respect to wave numbers is in a power-law form, an evaluation function may be designed based on degrees of dependence of spectral intensities on wave numbers. For a fractal signal f(x) in a section X, a power spectrum $S(\omega)=|F(\omega, X)|^2/X$ and a wave number ω are in a relationship represented by a following expression (2).

[Math. 2]

$$S(\omega)=\omega^{-(2H+1)} \quad (2)$$

"H" is a positive value called Hurst exponent and is used, in some cases, for an index indicating how complex a fractal signal is. In such a case, the power spectrum S(ω) can be approximated to a power-law form and can be used for an evaluation function to increase the fractality of an input signal, by defining "$L_f(f(x))$" as a following expression (3).

[Math. 3]

$$L_f(f(x))=|S(\omega)-\omega^{-(2H+1)}|_2^2 \quad (3)$$

"H" may be a fixed value, or may be a value that varies with a signal. When "H" takes an arbitrary value for each signal, an evaluation function may be designed based on a fact that "H" is constant across all sections of the wave numbers if the fractal signal is not multi-fractal. For example, an evaluation function that minimizes distribution of "H" is conceivable, as represented by following expressions (4) and (5).

[Math. 4]

$$H(\omega) - \left(\frac{\log(S(\omega))}{\log(\omega)} + 1\right)/2 \quad (4)$$

[Math. 5]

$$L_f(f(x)) = \left|H(\omega) - \hat{H}\right|_2^2 \quad (5)$$

By utilizing training of generative adversarial networks, "Gen" may be trained to be able to generate a fractal signal by simultaneously training "Gen", as a generative network, and a discriminative network that discriminates between a Gen (I) and another fractal signal.

In evaluation of fractality, the evaluation may reflect a restriction on search to determine the contraction function. For example, when the contraction function is determined through search and is used for evaluation of fractality at a time of learning, it is conceivable to impose a restriction on the search. Alternatively, an evaluation function related to a parameter of the contraction function may be separately added.

The feature map may be decomposed into arbitrary partial tensors, and fractal compression may be performed on each partial tensor, so that fractality may be computed for each partial tensor. For example, to represent a complex image by superimposing some simple fractal signals, it is conceivable to decompose the image into d two-dimensional tensors w'×h' for different channels. Alternatively, to achieve high-speed calculation by treating a search, at a time of fractal compression, as detection of self-similarity of a one-dimensional signal, it is conceivable to decompose the image into w'h' one-dimensional tensors d for different spatial positions. Any other decomposition method may be used.

Instead of a neural network, a dictionary learned beforehand may be used. For example, when it is assumed that the feature map generation unit 102 determines a feature map α, and that the image reconstruction unit 205 generates an image as a product of a dictionary D and the feature map α, the dictionary can be learned by using an expression (6) as follows.

[Math. 6]

$$D, \alpha = \operatorname*{argmin}_{D,\alpha} |D\alpha - I|_2^2 + L_f(\alpha) \quad (6)$$

Next, the contraction function generation unit 103 performs fractal compression of the feature map and generates a contraction function (step S103). Note that any method may be used for generating the contraction function. For example, the contraction function may be generated by estimating correspondence by using a general method, such as block matching, phase only correlation, or arbitrary feature matching. Alternatively, the contraction function may be generated by training a neural network that directly estimates a parameter of the contraction function.

The contraction function may include an arbitrary parameter. For example, in addition to an affine transform matrix or a vector indicating a corresponding position or a rotation, conceivable parameters include a parameter indicating a sampling filter, a parameter correcting a change in luminance, and the like.

The entropy encoding unit 104 performs entropy encoding of the contraction function and outputs a code (step S104). At the time, arbitrary additional information may be encoded together. For example, conceivable additional information includes an initialization parameter used when the image is reconstructed, an optimization parameter, and the like.

[Configuration of Image Decoding Device]

Next, a functional configuration of the image decoding device 200 will be described with reference to FIG. 3.

Figure 3:
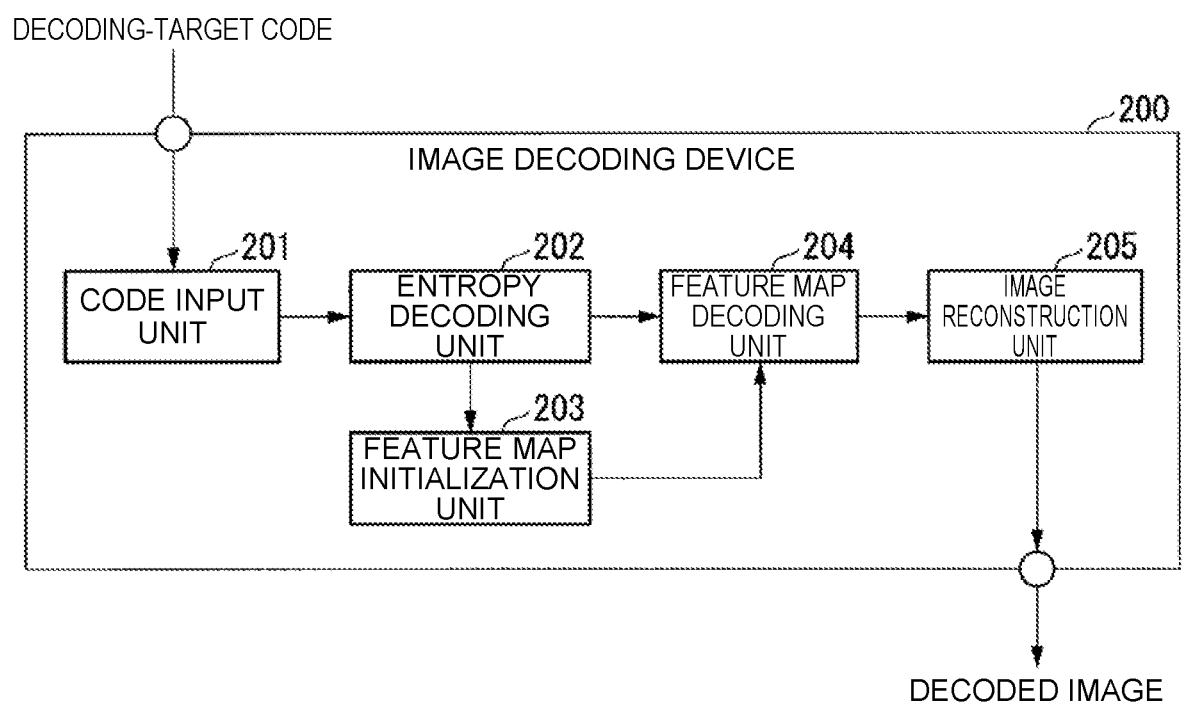
FIG. 3 is a block diagram showing a functional configuration of an image decoding device 200 according to an embodiment of the present invention.

FIG. 3 is a block diagram showing the functional configuration of the image decoding device 200 according to an embodiment of the present invention. As shown in FIG. 3, the image decoding device 200 includes a code input unit 201, an entropy decoding unit 202, a feature map initialization unit 203, a feature map decoding unit 204, and the image reconstruction unit 205.

The code input unit 201 (code acquisition unit) receives input of a code to be processed that is, for example, outputted from the image coding device 100. Hereinafter, the code to be processed will be referred to as "decoding-target code". The decoding-target code is, for example, a code obtained by entropy encoding of a contraction function generated through fractal compression by the contraction function generation unit 103 as described above. The code input unit 201 outputs the decoding-target code to the entropy decoding unit 202.

The entropy decoding unit 202 acquires the decoding-target code outputted from the code input unit 201. The entropy decoding unit 202 performs entropy decoding of the decoding-target image and generates a decoded contraction function. The entropy decoding unit 202 outputs the generated decoded contraction function to the feature map decoding unit 204.

The feature map initialization unit 203 initializes a decoded feature map. Note that for example, when an initialization parameter is set and encoded as additional information on an encoding side, the feature map initialization unit 203 may initialize the decoded feature map by decoding and using the initialization parameter.

The feature map decoding unit 204 acquires the decoded contraction function outputted from the entropy decoding unit 202. The feature map decoding unit 204 generates a decoded feature map from the decoded contraction function. The feature map decoding unit 204 generates the decoded feature map by iterated application of the decoded contraction function to the initialized decoded feature map, as in general fractal coding. The feature map decoding unit 204 outputs the generated decoded feature map to the image reconstruction unit 205.

The image reconstruction unit 205 acquires the decoded feature map outputted from the feature map decoding unit 204. The image reconstruction unit 205 generates a decoded image from the decoded feature map. The image reconstruction unit 205 generates the decoded image, for example, by a method using a neural network or a dictionary as described above, or the like. The image reconstruction unit 205 outputs the generated decoded image to, for example, an external device or the like.

[Operation of Image Decoding Device]

Next, operation of the image decoding device 200 shown in FIG. 3 will be described with reference to FIG. 4.

FIG. 4 is a flowchart showing the operation of the image decoding device 200 according to an embodiment of the present invention.

First, the code input unit 201 receives input of a decoding-target code (step S201). Next, the entropy decoding unit 202 performs entropy decoding of the decoding-target image and generates a decoded contraction function (step S202).

The feature map initialization unit 203 initializes a decoded feature map (step S203). Note that any method may be used for the initialization. For example, when an initialization parameter is set and encoded as additional information on an encoding side, the initialization parameter may be decoded and used.

The feature map decoding unit 204 generates a decoded feature map from the decoded contraction function (step S204). In the generation, the decoded contraction function is applied to the initialized decoded feature map iteratively, as in general fractal coding.

Lastly, the image reconstruction unit 205 generates a decoded image from the decoded feature map and outputs the decoded image (step S205). Note that the image reconstruction unit 205 may use any method to generate the decoded image. For example, various methods are conceivable, such as a method using a neural network or a dictionary as described above.

For example, in a case of a method through machine learning using a neural network, a dictionary, or the like, learning may be performed such that pixel-wise errors between the decoded image and the coding-target image are minimized, as represented by the above-mentioned expressions (1) and (6). Alternatively, learning may be performed by using another evaluation method as used in an image generation problem. For example, conceivable methods include a method using errors of a low-dimensional image feature, a method in which as generative adversarial networks, learning is performed concurrently with an image discriminative network, and the like.

In learning, the feature map generation unit 102 and the image reconstruction unit 205 may be trained at the same time as an autoencoder, or may be trained separately. When the feature map generation unit 102 and the image reconstruction unit 205 are trained as an autoencoder, a feature map outputted in between and a decoded feature map may be assumed to be the same, or a decoded feature map may be generated through fractal compression of a feature map and decoding, and then inputted into the image reconstruction unit 205. With the fractal compression interposed in between, an effect of eliminating noise, as with a denoising autoencoder, and an effect of compressing direct information about transformation into a feature map, as with vector quantization, can be brought about.

As described above, the image coding device 100 in the above-described embodiment transforms an arbitrary coding-target image into a set of feature maps, and performs fractal compression coding of the set of feature maps obtained through transformation. The image decoding device 200 in the above-described embodiment generates an image from feature maps obtained through fractal decoding, to obtain a decoded image. With a configuration as described above, the image coding device 100 and the image decoding device 200 can perform fractal compression coding with high efficiency while an amount of computation required for coding is restrained. The image coding device 100 generates a feature map such that the feature map can be represented by a contraction function with restriction, whereby fractal compression coding can be performed with high efficiency while an amount of computation required for coding is restrained.

The image coding device 100 and the image decoding device 200 in the above-described embodiment may be implemented by a computer. In such a case, each device may be implemented by recording a program for implementing the functions of the device in a computer-readable recording medium, and causing a computer system to read and execute the program recorded in the recording medium.

Note that the "computer system" here is assumed to include an OS and hardware such as peripheral equipment.

The "computer-readable recording medium" refers to a removable medium, such as a flexible disk, a magneto-optical disk, a ROM, or a CD-ROM, or a storage device such as a hard disk incorporated in the computer system. Moreover, "computer-readable recording media" may include anything that dynamically retains the program for a short time, such as a communication line used in a case where the program is transmitted over a network such as the Internet or a communication circuit such as a telephone circuit, and anything that retains the program for a certain time period, such as a volatile memory within the computer system that serves as a server or a client in the case where the program is transmitted. The above-mentioned program may be a program for implementing one or some of the above-described functions, may be a program that can implement the above-described functions by being combined with a program already recorded in the computer system, or may be a program that is realized with hardware such as a PLD (Programmable Logic Device) or an FPGA (Field Programmable Gate Array).

Hereinabove, an embodiment of the present invention has been described with reference to the drawings. However, the above-described embodiment is only an illustrative example of the present invention, and it is obvious that the present invention is not limited to the above-described embodiment. Accordingly, addition, omission, and replacement of a component, and any other changes to the components may be made to an extent that does not depart from the technical idea and the scope of the present invention.

REFERENCE SIGNS LIST

100 Image coding device
101 Image input unit
102 Feature map generation unit
103 Contraction function generation unit
104 Entropy encoding unit
200 Image decoding device
201 Code input unit
202 Entropy decoding unit
203 Feature map initialization unit
204 Feature map decoding unit
205 Image reconstruction unit

The invention claimed is:

1. An image coding method comprising:
an image acquisition step of acquiring a coding-target image;
a feature map generation step of generating a feature map, based on the image and an evaluation function, wherein the feature map has one or more fractals and each fractal has a fractal dimension and the fractal dimension includes a degree to which a feature fills available space, wherein the evaluation function is based on the fractal dimension and the fractal dimension is calculated for the coding-target image, such that the evaluation function is designed to have a greater loss result based on a code-target image having a lower fractality;
a contraction function generation step of performing fractal compression of the feature map and generating a contraction function; and
an entropy encoding step of performing entropy encoding of the contraction function.

2. An image coding device comprising:
a processor; and
a storage medium having computer program instructions stored thereon, when executed by the processor, perform to:
acquires a coding-target image;
generates a feature map, based on the image acquired by the image acquisition unit and an evaluation function, wherein the feature map has one or more fractals and each fractal has a fractal dimension and the fractal dimension includes a degree to which a feature fills available space, wherein the evaluation function is based on the fractal dimension and the fractal dimension is calculated for the coding-target image, such that the evaluation function is designed to have a greater loss result based on a code-target image having a lower fractality;
performs fractal compression of the feature map generated by the feature map generation unit and generates a contraction function; and
performs entropy encoding of the contraction function generated by the contraction function generation unit.

3. A non-transitory computer-readable medium having computer-executable instructions that, upon execution of the instructions by a processor of a computer, cause the computer to function as the image coding method according to claim 1.

4. The image coding method according to claim 1, wherein the feature map generation step includes generating the feature map using a neural network.

5. The image coding method according to claim 1, wherein the coding-target image includes an image to be processed.

6. The image coding method according to claim 1, wherein the coding-task image includes a first number of components, and the feature map includes a second number of components, and wherein the first number of components is not equal to the second number of components.

7. The image coding method according to claim 6, wherein the feature map includes a plurality of tensors with a different number of components.

* * * * *